United States Patent
Brolles et al.

(10) Patent No.: US 12,337,844 B2
(45) Date of Patent: Jun. 24, 2025

(54) METHOD OF OIL PRE-CONDITIONING FOR AN ELECTRIC POWERTRAIN OF A VEHICLE

(71) Applicant: VOLVO TRUCK CORPORATION, Gothenburg (SE)

(72) Inventors: Vincent Brolles, Saint Laurent de Mure (FR); Thomas Barillot, Mornant (FR); Nicolas Granottier, Lyons (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 303 days.

(21) Appl. No.: 17/929,069

(22) Filed: Sep. 1, 2022

(65) Prior Publication Data
US 2023/0069392 A1    Mar. 2, 2023

(30) Foreign Application Priority Data
Sep. 2, 2021    (EP) .................................... 21194580

(51) Int. Cl.
*B60W 30/192*    (2012.01)
*B60W 10/08*    (2006.01)
*B60W 10/11*    (2012.01)

(52) U.S. Cl.
CPC .......... *B60W 30/192* (2013.01); *B60W 10/08* (2013.01); *B60W 10/11* (2013.01);
(Continued)

(58) Field of Classification Search
CPC ........ B60K 17/16; B60K 17/04; B60K 17/02; B60W 30/192; B60W 10/08; B60W 10/11
See application file for complete search history.

(56) References Cited

U.S. PATENT DOCUMENTS

| 7,846,061 B2 | 12/2010 | Steinborn et al. |
| 8,554,400 B2 | 10/2013 | Ichioka et al. |

(Continued)

FOREIGN PATENT DOCUMENTS

| EP | 3184336 A1 * | 6/2017 | ............... B60K 1/00 |
| EP | 3854616 A1 | 7/2021 | |

(Continued)

OTHER PUBLICATIONS

Extended European Search Report in corresponding European Application No. 21194580.3 dated Feb. 14, 2022 (3 pages).

*Primary Examiner* — Christian Chace
*Assistant Examiner* — Shayne M. Gilbertson
(74) *Attorney, Agent, or Firm* — Venable LLP; Jeffri A. Kaminski

(57) ABSTRACT

A method of oil pre-conditioning for an electric powertrain for a vehicle configured to provide electric propulsion of the vehicle, said electric powertrain comprising the first electric motor being linked to the first gear module, a secondary shaft being linked to the second gear module, the second electric motor being linked to the third gear module through a motor shaft, the differential being shared by both electric motors, The electric powertrain is surrounded by an oil. The method includes the steps of selecting an oil pre-conditioning configuration wherein the secondary shaft does not rotate and at least one of the first electric motor or the second electric motor rotates while the other is in driving mode leading to the heating of the oil to reach a threshold temperature and applying the selected oil pre-conditioning configuration.

9 Claims, 4 Drawing Sheets

(52) U.S. Cl.
CPC .............. *B60W 2710/088* (2013.01); *B60W 2710/1072* (2013.01)

(56) References Cited

U.S. PATENT DOCUMENTS

| | | | |
|---|---|---|---|
| 8,604,738 B2 | 12/2013 | Takizawa | |
| 8,663,064 B2 | 3/2014 | Kaltenbach et al. | |
| 9,233,614 B2* | 1/2016 | Imamura | B60L 50/50 |
| 9,604,629 B2 | 3/2017 | Oshiumi | |
| 2021/0178889 A1* | 6/2021 | Singh | B60K 6/445 |
| 2021/0291646 A1* | 9/2021 | Lorenz | B60K 23/04 |

FOREIGN PATENT DOCUMENTS

| | | | |
|---|---|---|---|
| WO | 2021073748 A1 | 4/2021 | |
| WO | 2021121604 A1 | 6/2021 | |

\* cited by examiner

METHOD OF OIL PRE-CONDITIONING FOR AN ELECTRIC POWERTRAIN OF A VEHICLE

TECHNICAL FIELD

The invention relates to a method of oil pre-conditioning for an electric powertrain for a vehicle configured to provide electric propulsion of the vehicle.

Typically, the invention applies to an electric powertrain integrated into a vehicle axle. Such electric axle (or "E-axle") is a front or rear axle that includes an axle body (or "housing") adapted to receive a powertrain, which is arranged to provide torque to the wheels of the axle. The "E-Axle" is a compact and economical electric drive solution for battery electric vehicles, fuel cells and hybrid applications. The electric motor(s), electronics and transmission are combined in a compact unit that directly drives the wheels.

The invention can be applied in low-duty, medium-duty and heavy-duty vehicles, such as trucks, buses and construction equipment, as well as in passenger cars. Although the invention will be described with respect to a truck, the invention is not restricted to this particular vehicle type. Indeed, the electric powertrain of the invention could also be used in watercrafts such as ships or boats.

BACKGROUND

The transport industry is currently in the process of transition to electro-mobility, which implies the use of electric power to drive vehicles. Electro-mobility is mainly developed to meet increasingly stringent emission regulation requirements and the banning of internal combustion engine vehicles by some cities.

In order to free as much space as possible for batteries, chassis and other large parts, such as aerodynamic profiles, the powertrain must be as compact as possible.

Most electric motors have an ideal operating range that is achieved at high speed and low torque, while internal combustion engines have an ideal operating range that is achieved at low speed and high torque. In order to meet the torque demand at the wheels, typically for hill starts or high load starts, a relatively high reduction ratio (usually between 20 and 50) between the electric motor and the wheels is required. This reduction ratio can only be achieved with several reduction stages, which requires space.

The problem with using a gearbox with a fixed speed ratio is that the electric motor would run at high speed and low torque in cruise mode conditions and that in such conditions, the efficiency of the motor is not optimal. In addition, high-speed conditions also increase stresses on the gears, bearings and sealing rings of the transmission, which reduces the durability of the transmission.

In addition, a gearbox with gears rotating at high speed also creates lubrication problems. Indeed, a gear rotating too fast may not be lubricated properly since the oil between two successive teeth is ejected by centrifugal force and metal-to-metal contact may occur between the teeth of the two gears in mesh, which generates heat and, consequently, potentially irreversible mechanical damage.

Additionally, there is a need to ensure sufficient E-axle gearbox oil temperature when starting the vehicle. Indeed, if the oil is too cold when the vehicle starts, for example in cold ambient temperature conditions in the morning, some disadvantages may occur. Firstly, a cold oil exhibit a high viscosity that may lead to poor lubrication of the gears included in the gearbox. Moreover, an oil having a high viscosity may lead to both high churning/shearing & friction losses. There is thus a risk that the gearbox bearings and gears are not lubricated during a moment after the starting of the vehicle start. This may result in major damages of gearbox components and even gearbox breakdown. Finally, It may also be difficult to suck the oil from the oil sump through the oil pump and require a pump with huge motor, sized for the cold start/warm-up up (but oversized for the regular operating conditions, leading to unnecessary electrical power consumption and hence penalty on vehicle autonomy).

A solution consists in heating the oil to reach the minimum sucking oil temperature before the vehicle starts. Nevertheless, the solution requires the use of additional devices to heat the oil such as an oil electric heater. This solution is expensive and difficult to implement on a vehicle. Furthermore, this solution taking some times, the driver has to wait a long time before driving the vehicle.

It is to these disadvantages that the invention aims more particularly to remedy, by proposing a more compact and robust electric powertrain, and making it possible to ensure a better efficiency of the electric motor in many conditions by offering several gear ratios. Additionally, the invention aims to provide an electric powertrain that heat the oil until the desired temperature leading to a reduction of the gears splashing and the gears contact.

SUMMARY

The object is achieved by a method of oil pre-conditioning for an electric powertrain for a vehicle configured to provide electric propulsion of the vehicle, said electric powertrain comprising:

A transmission unit including a first electric motor, a second electric motor, a differential and a gearbox comprising a first gear module, a second gear module and a third gear module, the first electric motor being linked to the first gear module through a motor shaft, said first gear module including a primary shaft, on which are arranged a first primary gear which is fixed in rotation with respect to the primary shaft, a second primary gear, a third primary gear and a first primary coupling member, a secondary shaft being linked to the second gear module on which are arranged a first secondary gear that meshes with the first primary gear, a second secondary gear meshing with the second primary gear, a third secondary gear meshing with the third primary gear and a first secondary coupling member, the second electric motor being linked to the third gear module through a motor shaft, said third gear module including a tertiary shaft on which are arranged a first tertiary gear that does not mesh with any secondary gear, said first tertiary gear, a second tertiary gear that is meshing with the second secondary gear, a third tertiary gear that is meshing the third secondary gear and a first tertiary coupling member, said second tertiary gear and said third tertiary gear being adjacent, the differential being shared by both electric motors, Said electric powertrain being such that the first electric motor linked to the first gear module, the second gear module, and the second electric motor linked to the third gear module extend parallel to each other and said electric powertrain being surrounded by an oil, the method comprising the steps of:

A. Selecting an oil pre-conditioning configuration wherein the secondary shaft does not rotate and at least one of the first electric motor or the second electric motor rotates leading to the heating of the oil to reach a threshold temperature and B. Applying the selected oil pre-conditioning configuration.

By the provision of the method of oil pre-conditioning according to the present invention, the advantage is to provide an efficient heating of the oil until the desired temperature before the starting of the vehicle using robust and compact electric powertrains. Indeed, one of the first electric motor or the second electric motor rotates while the secondary shaft and therefore the wheels do not rotate leading to a reduction of gears splashing and gears contact generating heat. Furthermore, this method is easy to apply and allows the heating of the oil without the presence of the driver. Consequently, the method of oil pre-conditioning according to the present invention allow for a faster method, a reduction of the oil pre-conditioning costs and an increase of efficiency. In the present invention, the braking mode means that a force is applied at the brake wheel to stop the motion of one electric motor.

According to one embodiment, in step A), a first pre-conditioning configuration is such that the first secondary coupling member is in neutral position, the first primary coupling member is engaged in a first position in which it couples the second primary gear and the first tertiary coupling member is engaged in a first position in which it couples the second tertiary gear. In this embodiment, the first secondary coupling member is bidirectional leading to a higher efficiency to quickly heat the oil. Furthermore, the gears are submitted to a much higher torque, for example until the max motor torque capacity. Consequently, the gear contacts heat generation might be higher and the oil heating time might be lower. Moreover, the gears are rotating which might increase the churning loses and consequently the oil heating time.

According to one embodiment, in step A), a second pre-conditioning configuration is such that the first secondary coupling member is in neutral position, a second secondary coupling member is in neutral position, the first primary coupling member is engaged in a first position in which it couples the second primary gear and the first tertiary coupling member is engaged in a first position in which it couples the second tertiary gear. In this embodiment, the presence of the first secondary coupling member and the second secondary coupling member leads to a higher efficiency to quickly heat the oil. Furthermore, the gears are submitted and the gears are rotating increasing the churning loses and consequently the oil heating time.

According to one embodiment, in step A), a third pre-conditioning configuration is such that the first secondary coupling member is in neutral position, a second secondary coupling member is in neutral position, the first primary coupling member is engaged in a second position in which it couples the third primary gear and the first tertiary coupling member is engaged in a second position in which it couples the third tertiary gear. In this embodiment, the presence of the first secondary coupling member and the second secondary coupling member leads to a higher efficiency to quickly heat the oil. In this embodiment, it is believed that the electric powertrain is even more efficient resulting in a faster heating of the oil. Furthermore, the gears are submitted and the gears are rotating, increasing heat rejection into oil due to churning loses & friction and consequently the oil heating time.

According to one embodiment, the first electric motor is in driving mode while the second electric motor is in braking mode.

According to one embodiment, the first electric motor is in braking mode while the second electric motor is in driving mode.

According to one embodiment, in step A), a control device selects an oil pre-conditioning configuration. For example, the control device is linked to the electronic control unit (ECU). Alternatively, the control is integrated into the ECU. In this embodiment, the ECU may select and/or apply an oil pre-conditioning configuration before the starting of the vehicle.

According to one embodiment, in step A), the vehicle is manually or automatically turned on. In this embodiment, the driver may schedule the oil pre-conditioning at the desired time for example every day. Thus, the control device automatically turner on the vehicle and the oil pre-conditioning method. Alternatively, the driver may manually turned on the vehicle using for example the key. Thus, the control device automatically starts the oil pre-conditioning method.

According to one embodiment, the threshold temperature is equal to below −20° C.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

The present description is given in an X, Y, Z referential where X is defined as the longitudinal direction of the vehicle 1, Y is defined as the transversal direction and Z is defined as the vertical direction of the vehicle 1.

Figure 1:
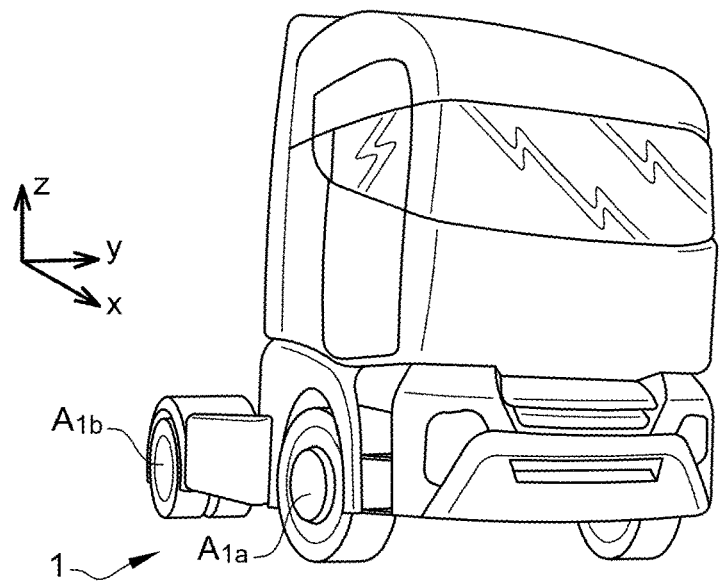
FIG. 1 is a perspective view of a vehicle, comprising an electric powertrain according to the invention, said powertrain being integrated into one of the axles of the vehicle, called "E-axle"

FIG. 1 shows a vehicle, which is an electric, fuel cell or hybrid vehicle, i.e. a vehicle using electric energy as a source of power. In the example, the vehicle is a truck 1, comprising two axles $A_{1a}$ and $A_{1b}$, respectively a front axle $A_{1a}$ and a rear axle $A_{1b}$.

In an alternative embodiment, the vehicle may include one or more front and/or rear axle(s). Each axle can alternatively be none driven or driven axle(s).

At least one of the two axles Ata and $A_{1b}$ is motorized, i.e. includes at least one electric motor. In the example, we consider that only the rear axle $A_{1b}$ is motorized, i.e. vehicle 1 is a propulsion vehicle (in which only the rear axle(s) is/are motorized). However, the invention obviously also applies to all-wheel drive vehicles and to traction vehicles (in which only the front axle(s) is/are motorized).

Axle $A_{1b}$ includes a powertrain 2, comprising a first electric motor (or "E-motor") EM1, a first and a second electric motor EM1, EM2 or a second electric motor EM2. In the example, the two motors EM1 and EM2 are identical in that they have the same characteristics (supply voltage, operating current, torque-speed characteristic, mechanical power, etc.). For example, the mechanical power of EM1 and EM2 are between 50KW to 500 kw. Alternatively, the two motors EM1 and EM2 can be different.

Advantageously, the electric motors EM1 and EM2 are AC type motors (synchronous or asynchronous). Alternatively, the electric motors EM1 and EM2 could be DC type motors as well (brushed). More generally, any electric motor is suitable.

As shown in FIGS. 2 to 7, the electric powertrain 2 according to the present invention comprises a first primary gear 31, a second primary gear 32 and a third primary gear 33 arranged on a primary shaft 34 to obtain a first gear module G1 and a first electric motor EM1 linked to the first gear module G1. The first electric motor EM1 comprises a motor shaft (or "rotor shaft") 14 on which may be arranged a pinion 16 meshing with the first primary gear 31.

The primary first primary gear 31 is fixed in rotation with respect to the primary shaft 34, the second primary gear 32 and a third primary gear 33. The primary first primary gear 31, the second primary gear 32 and a third primary gear 33 have each a different (outer diameter) and/or a different number of teeth. Typically, the primary first primary gear 31 has a diameter which is greater than that of the second primary gear 32 and the second primary gear 32 has a diameter that is greater than that of the third primary gear 33.

In the example, the first primary gear 31 is integral with shaft 34 (i.e. made in one-piece). However, the first primary gear 31 could be fixedly attached to shaft 34 as well, using fasteners, welding, splines or press-fitting or any other means. Besides, the second primary gear 32 and the third primary gear 33 are, in this particular arrangement, by default each free to rotate around primary shaft 34.

Typically, pinion 16 is fixed in rotation on motor shaft 14. For example, pinion 16 can be integral with shaft 14, meaning that pinion 16 and shaft 14 form a unique part.

A first primary coupling member 18 (also known as "gear shifting mechanism" or "dog clutch element") is arranged along the primary shafts 34 and which is movable between a first position in which it couples the second primary gear 32 in rotation with primary shaft 34, a second position in which it couples the third primary gear 33 in rotation with primary shaft 34 and a neutral position in which it does not prevent the second and third primary gears 32, 33 from rotating around primary shaft 34.

The electric powertrain 2 further comprises a first secondary gear 41 meshing with the first primary gear 31, a second secondary gear 42 meshing with the second primary gear 32, a third secondary gear 43 meshing with the third primary gear 33; said first secondary gear 41, second secondary gear 42 and third secondary gear 43 being arranged on a secondary shaft 44, also called "output shaft", to obtain a second gear module G2.

A first secondary coupling member 40, 47 (also known as "gear shifting mechanism" or "dog clutch element"), which is arranged along the secondary shaft 44 and which can be moved between an engaged position, in which it couples the first secondary gear 41 in rotation with the secondary shaft 44 and a neutral position, in which it allows the first secondary gear 41 to rotate freely around the secondary shaft 44.

The electric powertrain 2 comprises a first tertiary gear 51 configured to be fixed in rotation with respect to the tertiary shaft 54, a second tertiary gear 52 and a third tertiary gear 53 are arranged on the tertiary shaft 54. The first tertiary gear 51, the second tertiary gear 52 and the third tertiary gear 53 are arranged adjacent on the tertiary shaft 54 to obtain a third gear module G3. In the example, the second tertiary gear 52 and a third tertiary gear 53 are by default free to rotate around the tertiary shaft 54.

The second tertiary gear 52 meshes with the second secondary gear 42 fitted on secondary shaft 44 and the third input gear 53 meshes with the third secondary gear 43. The first input gear 51 does not mesh with any secondary gear, in particular with the first secondary gear 41. Indeed, the first secondary gear 41 is not present on the secondary shaft 44.

The second electric motor EM2 comprises a motor shaft 15. A pinion 17 is meshing with the first tertiary gear 51. The motor shaft 15 and the secondary shaft 44 extend parallel to each other.

In this embodiment, the two electric motors EM1 and EM2 are arranged transverse relative to the transversal direction of the vehicle, meaning that the axis of rotation of each motor EM1 and EM2 is perpendicular to the transversal direction of the vehicle. Accordingly, the powertrain 2 is said to be in a transverse configuration relative to the axle. The advantage of such transverse configuration is that it quite compact in the longitudinal side in comparison with a longitudinal configuration. To the contrary, a longitudinal arrangement requires less space in the transverse direction.

In this embodiment, EM1 linked to the first gear module G1, the second gear module G2 and EM2 linked to the third gear module G3 extend parallel to each other. The first gear module G1 is arranged in a first gear casing (not shown), the second gear module G2 is arranged in a second gear casing (not shown) and the third gear module G3 is arranged in a third gear casing (not shown). The first gear casing, the second gear casing and the third gear casing are adjacent. In an alternative embodiment, the first gear module G1, the second gear module G2 and the third gear module G3 are arranged in a common gear casing (not shown).

Preferably, the electric motors EM1 and EM2, the first gear module G1, the second gear module G2 and the third gear module G3 are encased inside the transmission housing. Alternatively, they could be outside of the transmission housing. In this case, the housing would include standard interfaces to assemble the electric motors EM1 and EM2.

Preferably, the electric motors EM1 and EM2 are powered by an electric power source, such as at least one battery or fuel cells, which are attached to another part of the vehicle, such as the chassis.

Besides, the differential 10 is connected to both electric motors EM1 and EM2. The crown wheel 12 and the output gear 46 are conical gears (also called bevel gear). In addition, the first secondary gear 41 is arranged between the second secondary gear 42 and the output gear 46 and gear 42 is between gears 41 and 43, meaning that the output gear 46 is typically arranged at the end of shaft 44.

The first gear module G1 is arranged in a first gear casing (not shown) and the second gear module G2 is arranged in a second gear casing (not shown), said first gear casing and the second gear casing being adjacent. The first gear module G1 and the second gear module G2 are arranged to obtain a gearbox G12. In this example, the first secondary gear 41 is by default free to rotate around the secondary shaft 44. In an alternative embodiment, the first gear module G1 and the second gear module G2 are arranged in a common gear casing (not shown).

The second gear module G2 is arranged in a second gear casing (not shown) and the third gear module G3 is arranged in a third gear casing (not shown), the second and the third gear casings being adjacent. The second gear module G2 and the third gear module G3 are included in a gearbox G23. In an alternative embodiment, the first gear module G1 and the second gear module G2 are arranged in a common gear casing (not shown).

A transmission unit includes a first electric motor EM1, a second electric motor EM2, a differential 10 and a gearbox G12, G23 comprising a first gear module G1, a second gear module G2 and a third gear module G3.

Preferably, the transmission ratios of gearbox G23 are different from that of gearbox G12. Typically, the first speed ratio of G12 ("EM1 gear 1") is lower than the first speed ratio of G23 ("EM2 gear 2"), the first speed ratio of G23 ("EM2 gear 2") is lower than the second speed ratio of G12 ("EM1 gear 3") and the second speed ratio of G12 ("EM1 gear 3") is lower than the second speed ratio of G23 ("EM2 gear 4"). The third speed ratio of G12, or "gear cruising ratio", is higher than the second speed ratio of G23 ("EM2 gear 4").

Advantageously, a first speed ratio ("EM1 gear 1") is obtained when the first coupling member 40, 47 is in neutral position and when the second coupling member 18 is in the second position. In this configuration, the torque is transmitted from the primary shaft 34 to the secondary shaft 44 through the pair of gears 33 and 43. The other gears, i.e. gears 32 and 41, are respectively unclutched from shafts 34 and 44. This means that the rotation speed of gear 32 is independent from that of shaft 34 and that the rotation speed of gear 41 is independent from that of shaft 44. In other words, gears 33 and 41 are free to rotate around shaft 34 and 44, respectively. Nevertheless, it does not mean that gears 32 and 41 remain immobile: Gears 32 and 42 are respectively rotationally driven by gears 43 and 31, which are each fixed in rotation with shaft 44 and 34, respectively.

Advantageously, a second speed ratio ("EM1 gear 3"), different from the first speed ratio, is obtained when the first coupling member 40 is in neutral position and when the coupling member 18 is in first position. In this configuration, the torque is transmitted from the primary shaft 34 to the secondary shaft 44 through the pair of gears 32 and 42. The other gears, i.e. gears 33 and 41, are respectively unclutched from shafts 34 and 44. This means that the rotation speed of gear 33 is independent from that of shaft 34 and that the rotation speed of gear 41 is independent from that of shaft 44. In other words, gears 33 and 41 are free to rotate around shaft 34 and 44, respectively. Nevertheless, it does not mean that gears 32 and 41 remain immobile: Gears 33 and 41 are respectively rotationally driven by gears 43 and 31, which are each fixed in rotation with shaft 34 and 44, respectively.

Advantageously, a third speed ratio ("EM1 cruise gear"), different from the first two speed ratios, is obtained when the first coupling member 40 is in the engaged position and the second coupling member 18 is in the neutral position. In this configuration, the torque is transmitted from the primary shaft 34 to the secondary shaft 44 through the pair of gears 31 and 41. The other gears, i.e. gears 32 and 33, are unclutched from shaft 34. This means that the rotation speeds of gears 32 and 33 are independent from the rotation speed of the shaft 34. In other words, gears 32 and 33 are free to rotate around shaft 34. Nevertheless, it does not mean that gears 32 and 33 remain immobile: Gears 32 and 33 are respectively rotationally driven by gears 42 and 43, which are fixed in rotation with shaft 44.

Advantageously, a first speed ratio ("EM2 gear 2") is obtained when the coupling member 55 is in the second position. In this configuration, the torque is transmitted from the shaft 54 to the secondary shaft 44 through the pair of gears 53 and 43. This means that the rotation speed of gear 52 is independent from that of shaft 54. In other words, gear 52 is free to rotate around shaft 54. Nevertheless, it does not mean that gears 52 remains stationary. Gear 52 is rotationally driven by gear 42, which is fixed in rotation with shaft 44.

Advantageously, a second speed ratio ("EM2 gear 4") is obtained when the coupling member 55 is in the first position. In this configuration, the torque is transmitted from the shaft 54 to the secondary shaft 44 through the pair of gears 52 and 42. This means that the rotation speed of gear 53 is independent from that of shaft 54. In other words, gear 53 is free to rotate around shaft 54. Nevertheless, it does not mean that gear 53 remains immobile. Gear 53 is rotationally driven by gear 43 which is fixed in rotation with shaft 44.

All in all, the two gearboxes G12 and G23 form together a multi-input transmission, capable of selectively transmitting the torque of E-motor EM1 and the torque of E-motor EM2 (as inputs of the transmission) to the wheels, typically through the differential 10 (as output of the transmission).

The electric powertrain 2 is surrounded by oil. For example, the oil is sucked from an oil sump through an oil pump.

The method of oil pre-conditioning according to the present invention comprises a step A) wherein an oil pre-conditioning configuration is selected. In the oil pre-conditioning configuration, the secondary shaft 44 does not rotate and one of the first electric motor EM1 or the second electric motor EM2 is in braking mode while the other is in driving mode leading to the heating of the oil to reach a threshold temperature. In step B), the selected oil pre-conditioning configuration is then applied.

Figure 2:
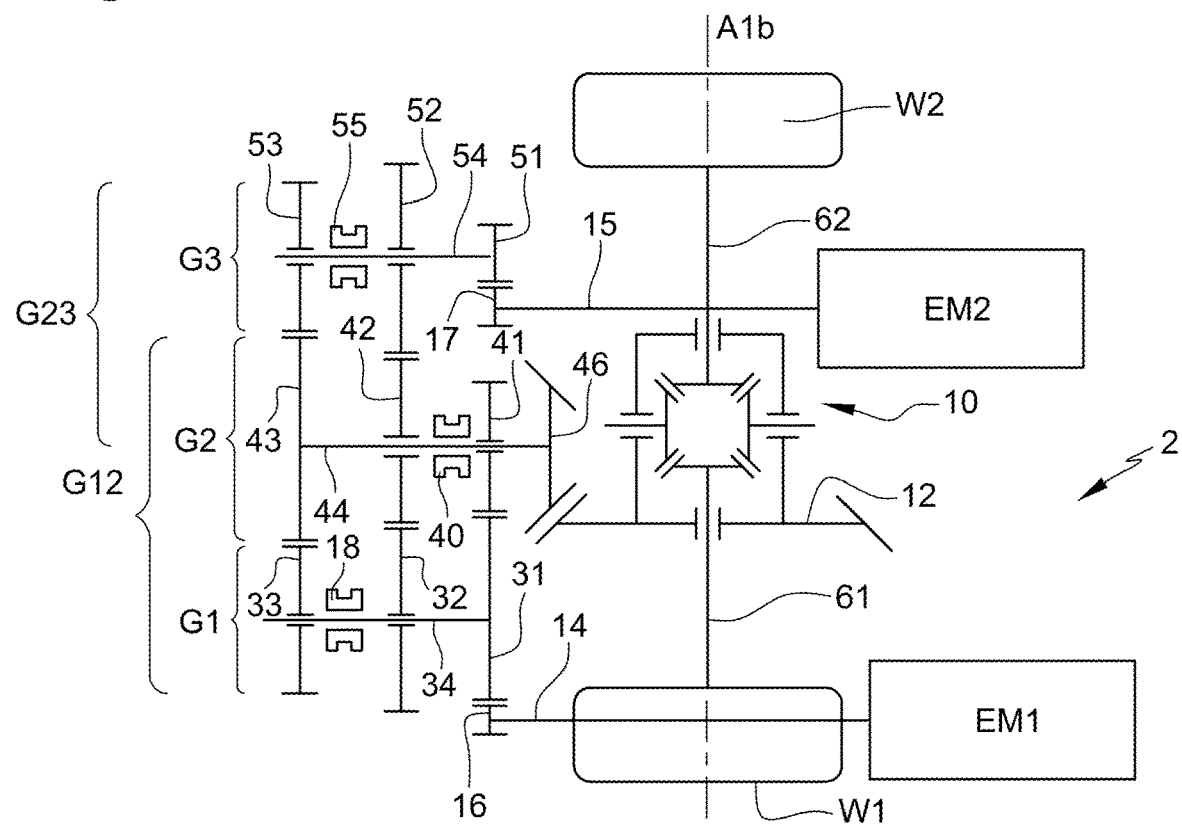
FIG. 2 is a schematic representation of the electric powertrain according to the one embodiment.
Figure 3:
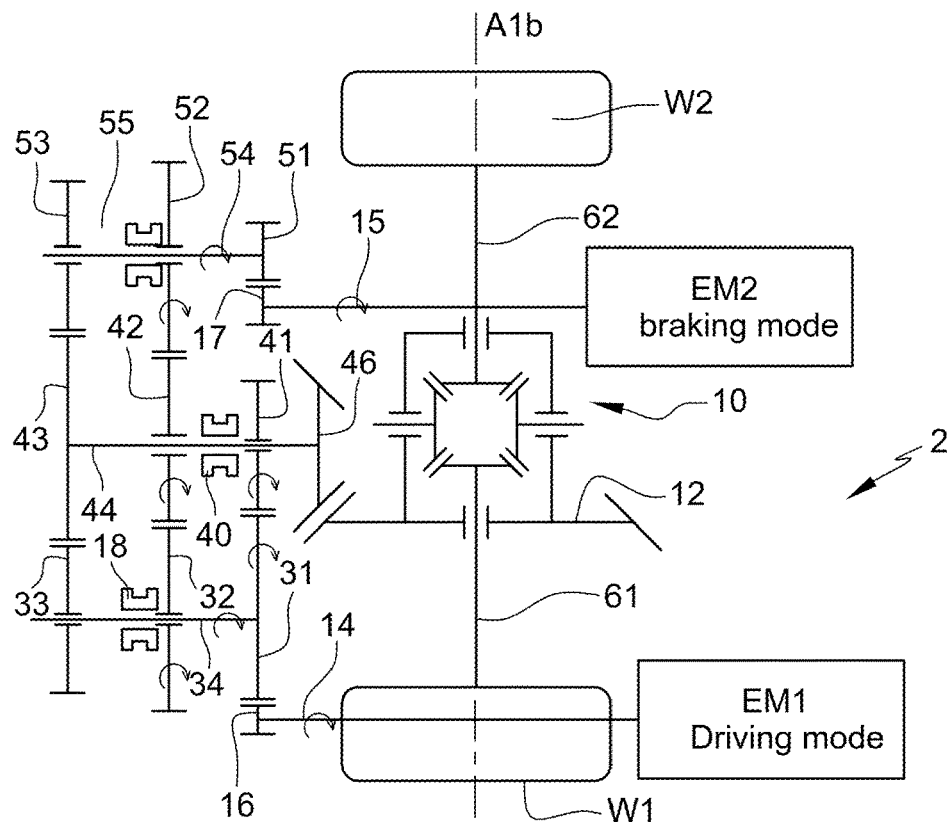
FIG. 3 is a schematic representation of the electric powertrain according to the one embodiment.

FIGS. 2 and 3 illustrate an embodiment wherein in step A), a first pre-conditioning configuration is such that the first secondary coupling member 40 is in neutral position, the first primary coupling member 18 is engaged in a first position in which it couples the second primary gear 32 and the first tertiary coupling member 55 is engaged in a first position in which it couples the second tertiary gear 52.

The first electric motor EM1 may be in driving mode while the second electric motor EM2 may be in braking mode. In this embodiment, the first secondary coupling member 40 is bidirectional and the gears are submitted to a much higher torque leading to a higher generation of heat.

Figure 4:
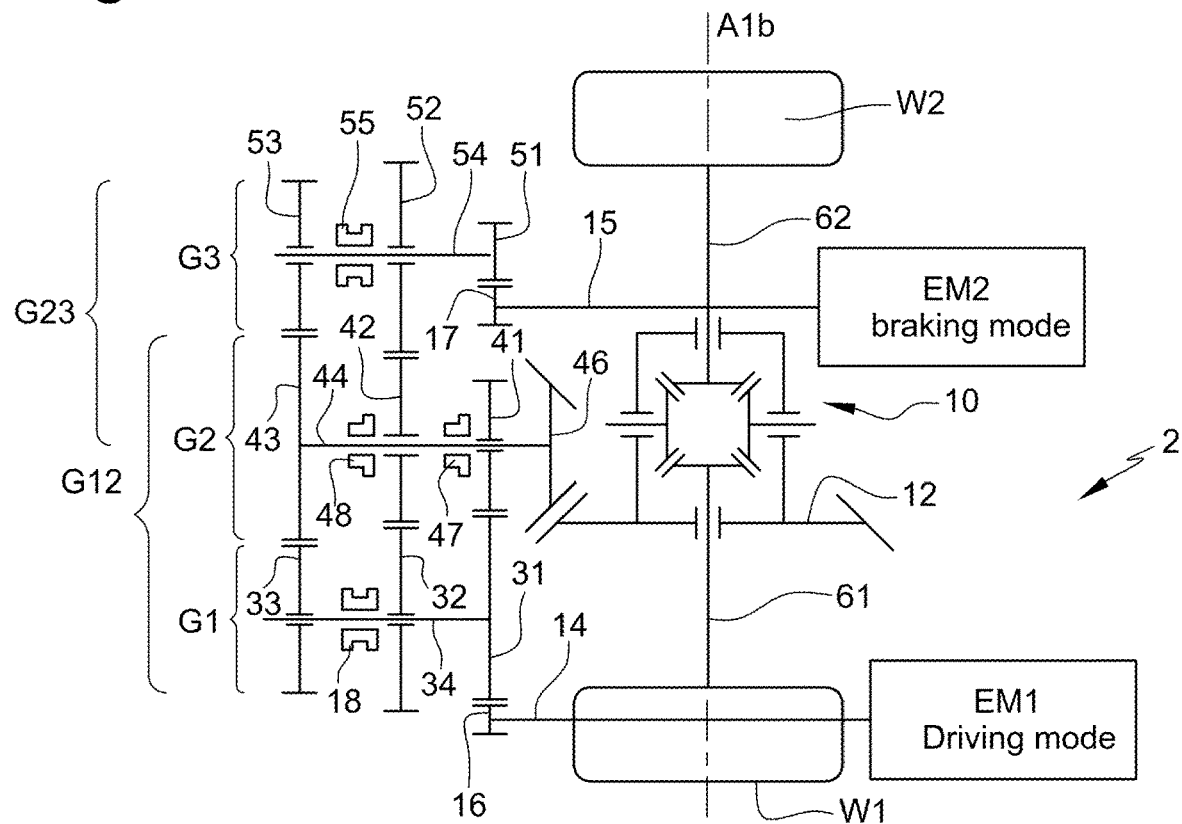
FIG. 4 is a schematic representation of the electric powertrain according to the one embodiment.
Figure 5:
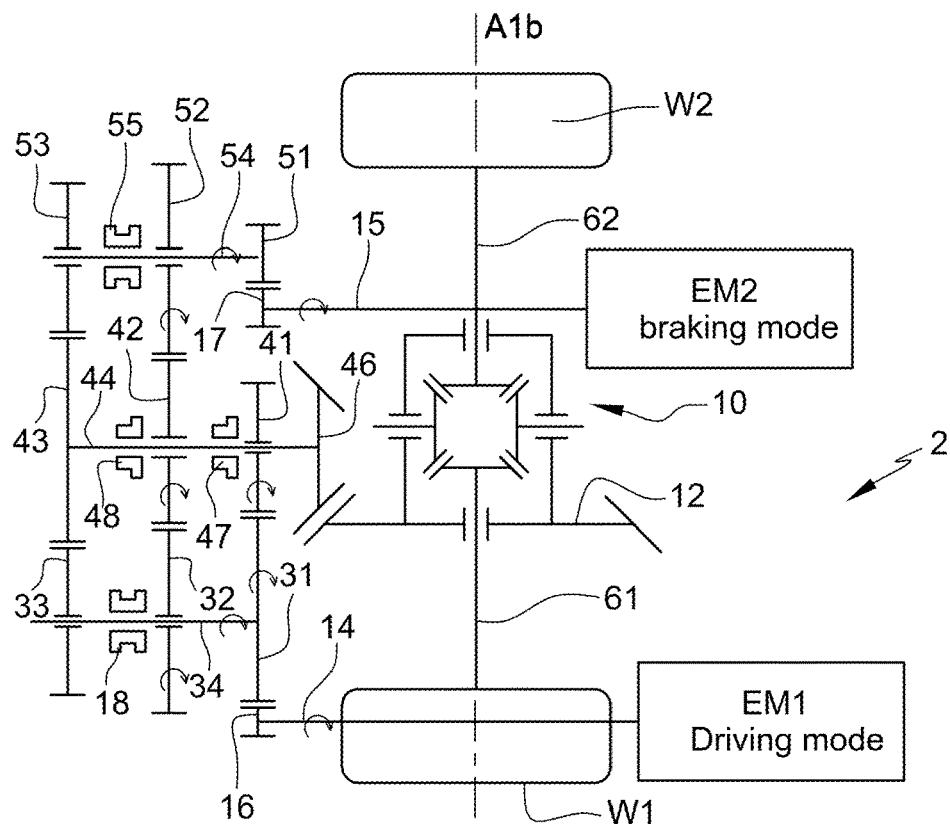
FIG. 5 is a schematic representation of the electric powertrain according to the one embodiment.

FIGS. 4 and 5 illustrate an embodiment wherein in step A), a second pre-conditioning configuration is such that the first secondary coupling member 47 is in neutral position, a second secondary coupling member 48 is in neutral position, the first primary coupling member 18 is engaged in a first position in which it couples the second primary gear 32 and the first tertiary coupling member 55 is engaged in a first position in which it couples the second tertiary gear 52.

The first electric motor EM1 may be in driving mode while the second electric motor EM2 may be in braking mode. In this embodiment, the presence of the first secondary coupling member 47 and the second secondary coupling member 48 and the gears submitted to a much higher torque leading to an optimized oil heating.

Figure 6:
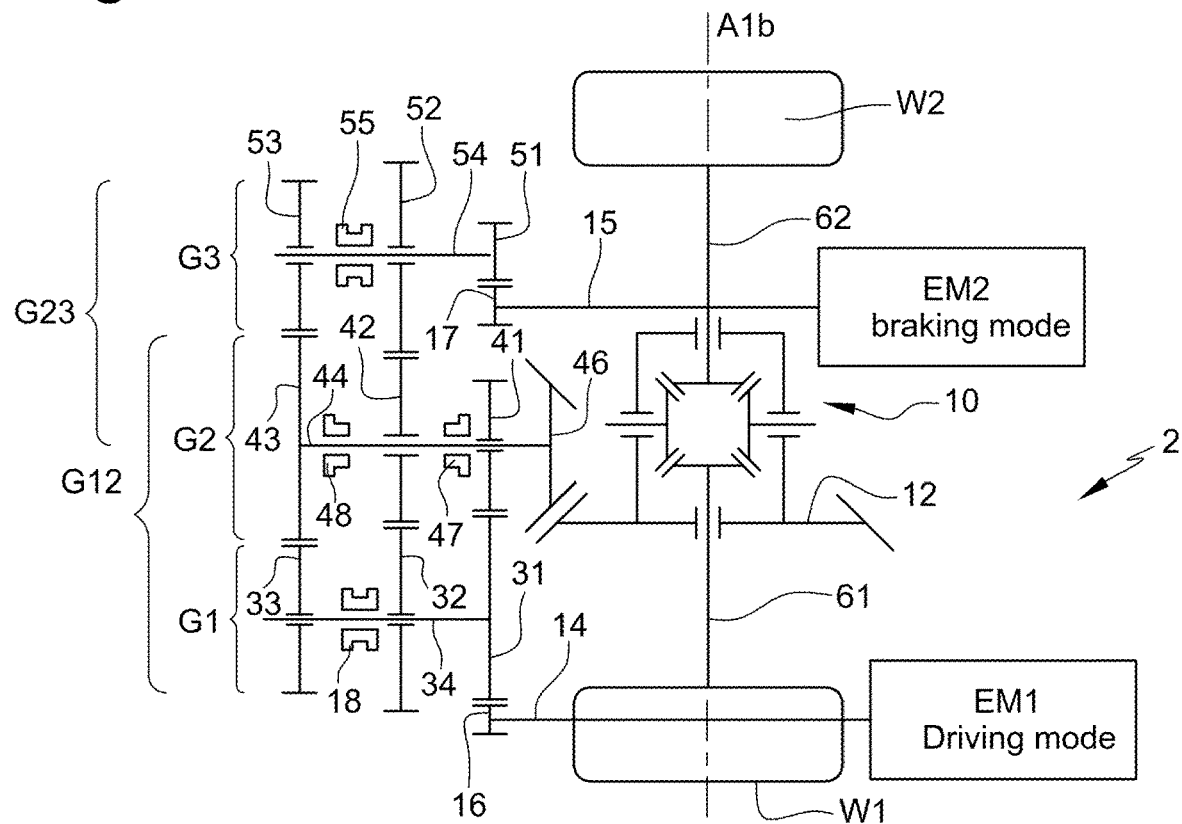
FIG. 6 is a schematic representation of the electric powertrain according to the one embodiment and FIG. 7 is a schematic representation of the electric powertrain according to the one embodiment.
Figure 7:
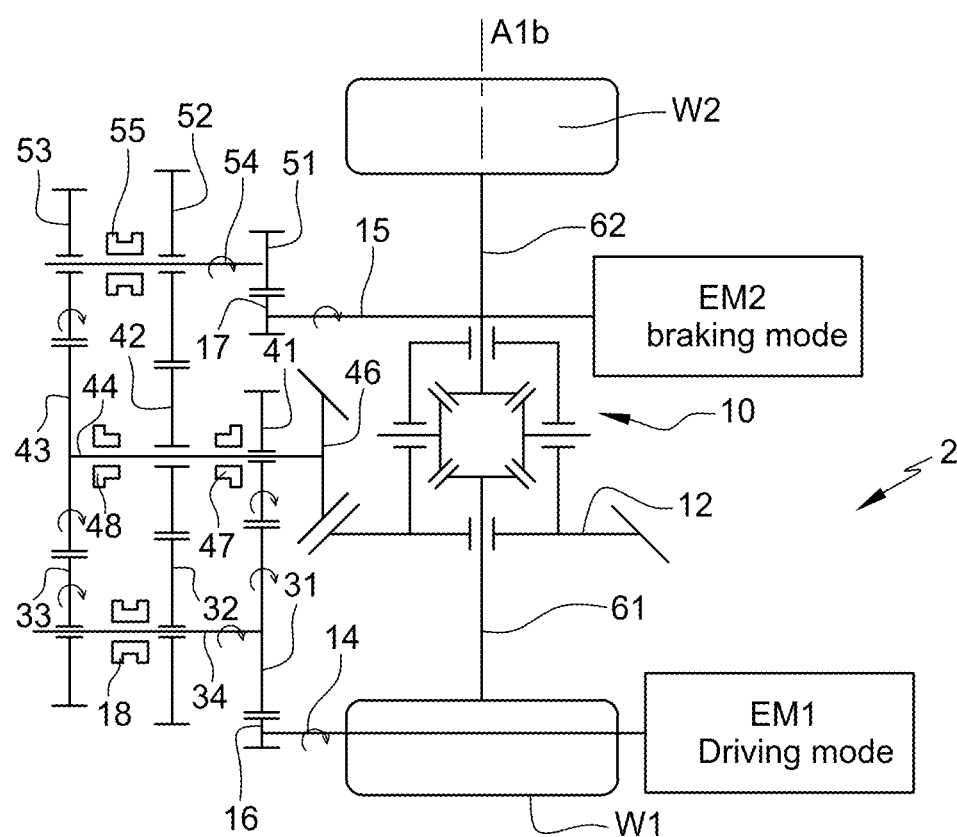

FIGS. 6 and 7 illustrate an embodiment wherein in step A), a third pre-conditioning configuration is such that the first secondary coupling member 47 is in neutral position, a second secondary coupling member 48 is in neutral position, the first primary coupling member 18 is engaged in a second position in which it couples the third primary gear 33 and the first tertiary coupling member 55 is engaged in a second position in which it couples the third tertiary gear 53.

The first electric motor EM1 may be in driving mode while the second electric motor EM2 may be in braking mode. In this embodiment, the presence of the first secondary coupling member 47 and the second secondary coupling member 48 and the gears submitted to a much higher torque leading to an optimized oil heating.

For example, in step A), a control device selects an oil pre-conditioning configuration. The selection of the oil pre-conditioning configuration may be performed automatically or manually.

In step A), the vehicle may be manually turned on by the driver or automatically turned on by the driver.

For example, the threshold temperature is equal to below −20° C.

It is to be understood that the present invention is not limited to the embodiments described above and illustrated in the drawings; rather, the skilled person will recognize that many changes and modifications may be made within the scope of the appended claims. The method according to the present invention provides an efficient heating of the oil until the desired temperature before the starting of the vehicle. Furthermore, this method is cost saving and easily comprehensible.

The invention claimed is:

1. A method of oil pre-conditioning for an electric powertrain for a vehicle configured to provide electric propulsion of the vehicle, said electric powertrain comprising:
  a transmission unit including a first electric motor, a second electric motor, a differential and a gearbox comprising a first gear module, a second gear module and a third gear module,
  the first electric motor linked to the first gear module through a motor shaft, said first gear module including a primary shaft, on which are arranged a first primary gear which is fixed in rotation with respect to the primary shaft, a second primary gear, a third primary gear and a first primary coupling member,
  a secondary shaft linked to the second gear module on which are arranged a first secondary gear that meshes with the first primary gear, a second secondary gear meshing with the second primary gear, a third secondary gear meshing with the third primary gear and a first secondary coupling member,
  the second electric motor being linked to the third gear module through a motor shaft, said third gear module including a tertiary shaft on which are arranged a first tertiary gear that does not mesh with any secondary gear, a second tertiary gear that is meshing with the second secondary gear, a third tertiary gear that is meshing the third secondary gear and a first tertiary coupling member, said second tertiary gear and said third tertiary gear being adjacent,
  the differential being shared by both electric motors, said electric powertrain being such that the first electric motor linked to the first gear module, the second gear module, and the second electric motor linked to the third gear module extend parallel to each other and said electric powertrain being surrounded by an oil, the method comprising the steps of:
    A. Selecting an oil pre-conditioning configuration wherein the secondary shaft does not rotate and at least one of the first electric motor or the second electric motor rotates in a braking mode while the other is in a driving mode leading to the heating of the oil to reach a threshold temperature and
    B. Applying the selected oil pre-conditioning configuration.

2. The method of oil pre-conditioning according to claim 1, wherein in step A), a first pre-conditioning configuration is such that the first secondary coupling member is in neutral position, the first primary coupling member is engaged in a first position in which it couples the second primary gear and the first tertiary coupling member is engaged in a first position in which it couples the second tertiary gear).

3. The method of oil pre-conditioning according to claim 1, wherein in step A), a second pre-conditioning configuration is such that the first secondary coupling member is in neutral position, a second secondary coupling member is in neutral position, the first primary coupling member is engaged in a first position in which it couples the second primary gear and the first tertiary coupling member is engaged in a first position in which it couples the second tertiary gear.

4. The method of oil pre-conditioning according to claim 1, wherein in step A), a third pre-conditioning configuration is such that the first secondary coupling member is in neutral position, a second secondary coupling member is in neutral position, the first primary coupling member is engaged in a second position in which it couples the third primary gear 33 and the first tertiary coupling member is engaged in a second position in which it couples the third tertiary gear.

5. The method of oil pre-conditioning according to claim 1, the first electric motor is in driving mode while the second electric motor is in braking mode.

6. The method of oil pre-conditioning according to claim 1, the first electric motor is in braking mode while the second electric motor is in driving mode.

7. The method of oil pre-conditioning according to claim 1, wherein in step A), a control device selects an oil pre-conditioning configuration.

8. The method of oil pre-conditioning according to claim 1, wherein before step A), the vehicle is manually or automatically turned on.

9. The method of oil pre-conditioning according to claim 1, wherein the threshold temperature is equal to below −20° C.

* * * * *